US012610301B2

(12) United States Patent
Lei

(10) Patent No.: US 12,610,301 B2
(45) Date of Patent: Apr. 21, 2026

(54) NETWORK HANDOVER PROCESSING METHOD, NETWORK HANDOVER PROCESSING APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 18/350,023

(22) Filed: Jul. 11, 2023

(65) Prior Publication Data
US 2023/0354141 A1     Nov. 2, 2023

Related U.S. Application Data

(63) Continuation of application No. PCT/CN2022/128992, filed on Nov. 1, 2022.

(30) Foreign Application Priority Data

Dec. 31, 2021    (CN) .......................... 202111679434.5

(51) Int. Cl.
*H04W 36/38* (2009.01)
*H04W 36/18* (2009.01)
*H04W 36/22* (2009.01)

(52) U.S. Cl.
CPC ......... *H04W 36/385* (2013.01); *H04W 36/18* (2013.01); *H04W 36/22* (2013.01)

(58) Field of Classification Search
CPC .... H04W 36/18; H04W 36/22; H04W 36/385
See application file for complete search history.

(56) References Cited

U.S. PATENT DOCUMENTS

2015/0045028 A1* 2/2015 Singh ................ H04W 36/0094
                                                        455/436
2019/0335365 A1* 10/2019 Ying ................. H04W 36/0011
                        (Continued)

FOREIGN PATENT DOCUMENTS

CN          101322432 A       12/2008
CN          109600759 A        4/2019
                        (Continued)

OTHER PUBLICATIONS

International Search Report for PCT/CN2022/128992 dated Jan. 28, 2023.

(Continued)

*Primary Examiner* — Melanie Jagannathan
(74) *Attorney, Agent, or Firm* — Sughrue Mion, PLLC

(57) ABSTRACT

A network handover processing method including: receiving traffic stream feature information sent by a network data analysis functional entity, the traffic stream feature information indicating features of service data packets transmitted between the application side and user equipment, and the traffic stream feature information being generated by the network data analysis functional entity in accordance with the service data packets transmitted in a network; and generating, based on the traffic stream feature information, a handover policy to be followed during a handover of an access network entity connected to the user equipment; and sending the handover policy to a session management functional entity, so that the session management functional entity configures the handover policy to another network entity. This can ensure that the handover policy matches actual traffic stream feature information, so as to avoid high handover costs and waste of network resources.

20 Claims, 8 Drawing Sheets

(56)          References Cited

U.S. PATENT DOCUMENTS

| | | | | |
|---|---|---|---|---|
| 2020/0112907 A1* | 4/2020 | Dao | .................. | H04M 15/8016 |
| 2020/0228420 A1* | 7/2020 | Dao | ..................... | H04L 41/142 |
| 2021/0083956 A1* | 3/2021 | Fan | .................... | H04L 43/0876 |
| 2021/0105685 A1* | 4/2021 | Li | ..................... | H04W 36/0011 |
| 2022/0248287 A1* | 8/2022 | Chong | ................. | H04W 24/02 |
| 2023/0056442 A1* | 2/2023 | Ly | ........................ | H04W 24/04 |
| 2023/0127601 A1* | 4/2023 | Kousaridas | ........... | H04W 40/12 |
| | | | | 455/432.1 |
| 2023/0276306 A1* | 8/2023 | Jimenez Cordon | ... | H04W 76/10 |
| | | | | 370/331 |
| 2025/0133438 A1* | 4/2025 | Lee | ...................... | H04L 47/283 |
| 2025/0274348 A1* | 8/2025 | Sung | .................... | H04W 84/10 |

FOREIGN PATENT DOCUMENTS

| | | |
|---|---|---|
| CN | 110708734 A | 1/2020 |
| CN | 112243199 A | 1/2021 |
| CN | 112584447 A | 3/2021 |
| CN | 113438704 A | 9/2021 |
| JP | 2015-002431 A | 1/2015 |

OTHER PUBLICATIONS

Written Opinion for PCT/CN2022/128992 dated Jan. 28, 2023.
Office Action issued Jan. 1, 2026 in CN Application No. 202111679434.
5.

\* cited by examiner

Arrival interval of data packets
at an application layer:

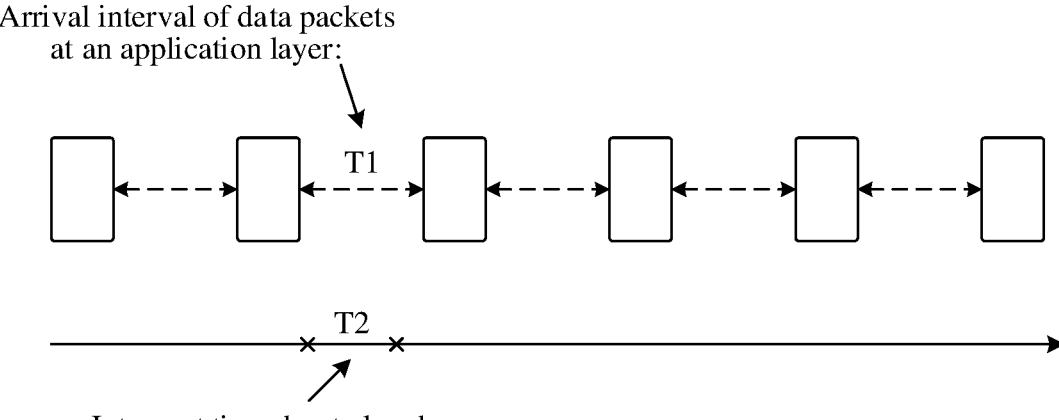

Interrupt time due to handover

FIG. 6

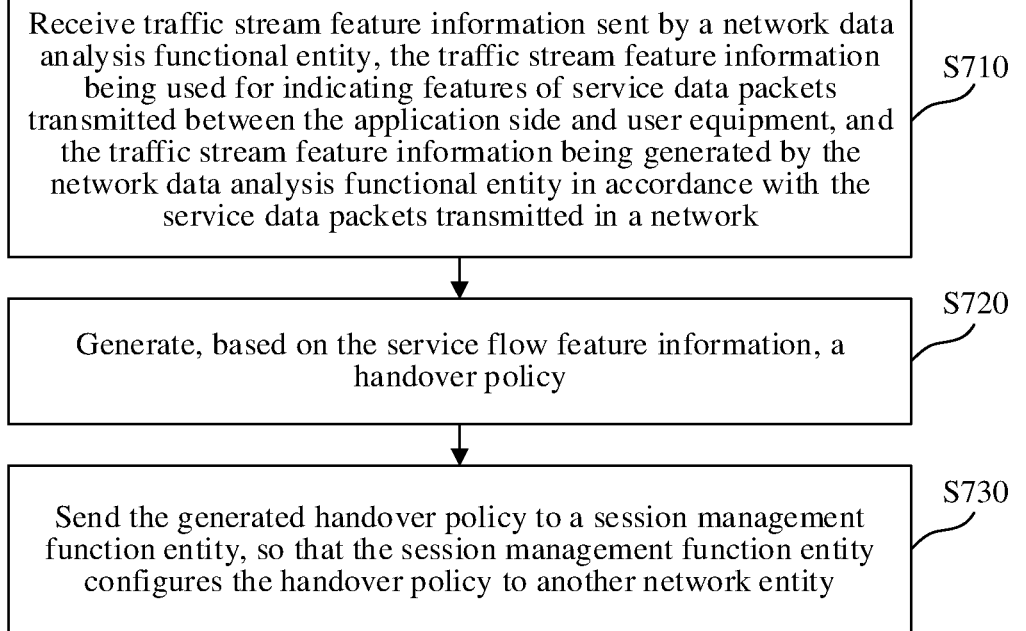

Receive traffic stream feature information sent by a network data analysis functional entity, the traffic stream feature information being used for indicating features of service data packets transmitted between the application side and user equipment, and the traffic stream feature information being generated by the network data analysis functional entity in accordance with the service data packets transmitted in a network

S710

Generate, based on the service flow feature information, a handover policy

S720

Send the generated handover policy to a session management function entity, so that the session management function entity configures the handover policy to another network entity

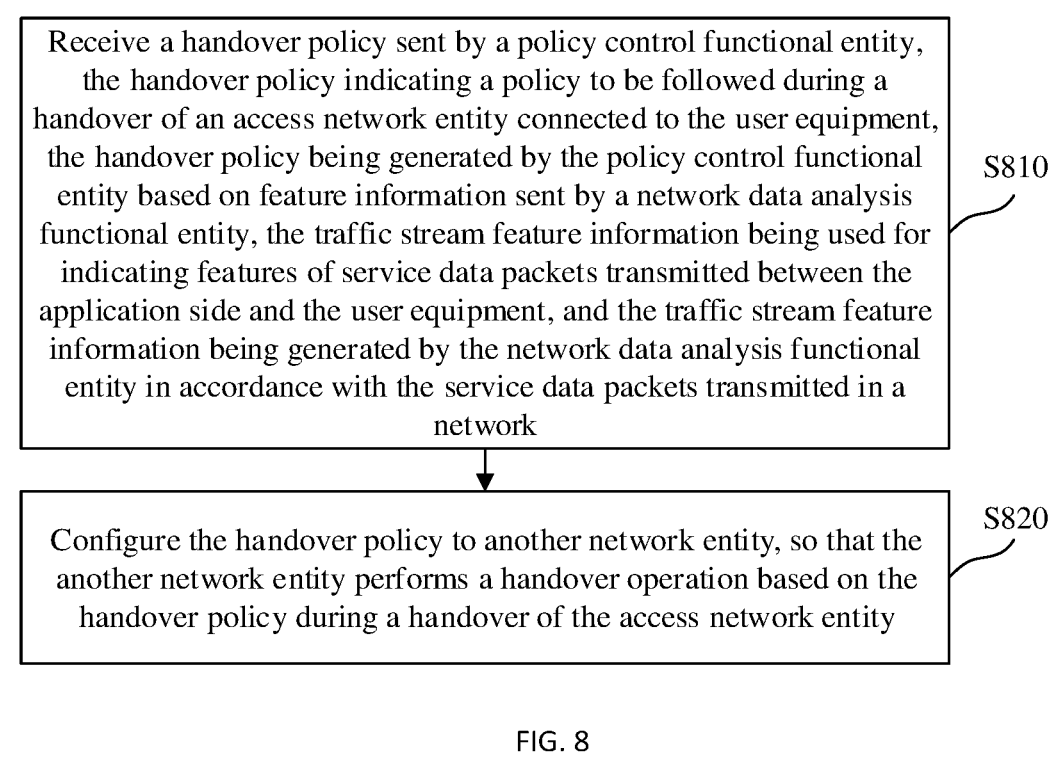

Receive a handover policy sent by a policy control functional entity, the handover policy indicating a policy to be followed during a handover of an access network entity connected to the user equipment, the handover policy being generated by the policy control functional entity based on feature information sent by a network data analysis functional entity, the traffic stream feature information being used for indicating features of service data packets transmitted between the application side and the user equipment, and the traffic stream feature information being generated by the network data analysis functional entity in accordance with the service data packets transmitted in a network          S810

Configure the handover policy to another network entity, so that the another network entity performs a handover operation based on the handover policy during a handover of the access network entity          S820

FIG. 8

NETWORK HANDOVER PROCESSING METHOD, NETWORK HANDOVER PROCESSING APPARATUS, COMPUTER-READABLE MEDIUM, AND ELECTRONIC DEVICE

RELATED APPLICATION

This application is a continuation of International Patent Application No. PCT/CN2022/128992, filed on Nov. 1, 2022, which claims priority to Chinese Patent Application No. 202111679434.5 filed with the China National Intellectual Property Administration on Dec. 31, 2021, which are incorporated herein by reference in their entireties.

FIELD

This application relates to the field of communication technologies, and in particular, to network handover processing technologies.

BACKGROUND

A 5G system has two networking modes: non-standalone (NSA) and standalone (SA). In both networking modes, a handover mechanism is introduced to avoid xx data loss when user equipment (UE) hands over connected access network equipment (e.g., a base station). To guarantee handover performance (for example, to reduce data transmission delay caused by handover), various handover mechanisms have been proposed in related art, but these handover mechanisms generally have the problems of high costs and excessive network resources required.

SUMMARY

Embodiments of this application provide a network handover processing method, a network handover processing apparatus, a computer-readable medium, and an electronic device, which can ensure that a handover policy matches actual traffic stream feature information to some extent, so as to avoid high handover costs and waste of network resources while ensuring handover performance.

Other features and advantages of this application become obvious through the following detailed descriptions or partially learned through the practice of this application.

According to some aspects, an embodiment of this application provide a network handover processing method, executed by a policy control functional entity, the method including:

receiving traffic stream feature information provided by a network data analysis functional entity, the traffic stream feature information indicating features of service data packets transmitted between the application side and user equipment, the traffic stream feature information being generated by the network data analysis functional entity in accordance with the service data packets transmitted in a network generating, based on the traffic stream feature information, a handover policy, the handover policy being a policy to be followed during a handover of an access network entity connected to the user equipment; and transmitting the handover policy to a session management functional entity, so that the session management functional entity configures the handover policy to another network entity.

It is to be understood that, the foregoing general descriptions and the following detailed descriptions are merely for illustration and explanation purposes and are not intended to limit the disclosure.

BRIEF DESCRIPTION OF THE DRAWINGS

Accompanying drawings herein are incorporated into the specification and constitute a part of this specification, show embodiments that conform to the disclosure, and are used for describing a principle of the disclosure together with this specification. Apparently, the accompanying drawings described below are merely some embodiments of the disclosure, and a person of ordinary skill in the art may further obtain other accompanying drawings according to the accompanying drawings without creative efforts. In the accompanying drawings:

FIG. 6 is a schematic diagram showing a transmission interval of data packets and interrupt time due to handover.

FIG. 7 is a flowchart of a network handover processing method according to some embodiments.

FIG. 8 is a flowchart of a network handover processing method according to some embodiments.

DETAILED DESCRIPTION

Figure 1:
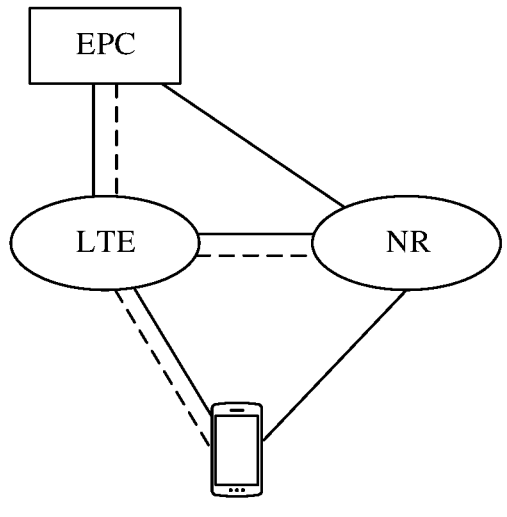
FIG. 1 is a schematic diagram of a networking mode for a 5G system.

In order to make objects, technical solutions, and advantages of the disclosure more obvious, certain embodiments according to the disclosure are described in detail below with reference to the drawings. The described embodiments are not to be construed as a limitation to the present disclosure. All other embodiments obtained by a person of ordinary skill in the art without creative efforts shall fall within the protection scope of the present disclosure and accompanying claims.

In the following descriptions, related "some embodiments" describe a subset of all possible embodiments. However, it may be understood that the "some embodiments" may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B".

The character "/" in this specification generally indicates an "or" relationship between the associated objects unless otherwise noted or the context suggests otherwise.

In addition, the features, structures or characteristics described herein may be combined in one or more embodiments in any appropriate manner. In the following descriptions, a lot of specific details are provided to give a comprehensive understanding of some embodiments of the disclosure. However, a person skilled in the art is to be aware that, the technical solutions in this application may be implemented without using all particular details, one or more of the particular details may be omitted, or another method, unit, apparatus, or operation may be used.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/operations, and do not need to be performed in the described orders either. For example, some operations/operations may be further divided, while some operations/operations may be combined or partially combined. Therefore, an actual execution order may change according to an actual case.

According to some aspects, some embodiments of this application provides a network handover processing method, executed by a session management functional entity, the method including:

receiving a handover policy sent by a policy control functional entity, the handover policy indicating a policy to be followed during a handover of an access network entity connected to the user equipment, the handover policy being generated by the policy control functional entity based on feature information sent by a network data analysis functional entity, the traffic stream feature information indicating features of service data packets transmitted between the application side and the user equipment, and the traffic stream feature information being generated by the network data analysis functional entity in accordance with the service data packets transmitted in a network; and configuring the handover policy to another network entity, so that the another network entity performs a handover operation based on the handover policy during a handover of the access network entity.

According to some aspects, some embodiments of this application provides a network handover processing apparatus, including: a first receiving unit, configured to receive traffic stream feature information sent by a network data analysis functional entity, the traffic stream feature information indicating features of service data packets transmitted between the application side and user equipment, and the traffic stream feature information being generated by the network data analysis functional entity in accordance with the service data packets transmitted in a network; and a generation unit, configured to generate, based on the traffic stream feature information, a handover policy to be followed during a handover of an access network entity connected to the user equipment; and a transmitting unit, configured to send the handover policy to a session management functional entity, so that the session management functional entity configures the handover policy to another network entity.

According to some aspects, some embodiments of this application provides a network handover processing apparatus, including: a second receiving unit, configured to receive a handover policy sent by a policy control functional entity, the handover policy being generated by the policy control functional entity based on traffic stream feature information sent by a network data analysis functional entity, and the traffic stream feature information indicating features of service data packets transmitted between the application side and the user equipment, and the traffic stream feature information being generated by the network data analysis functional entity in accordance with the service data packets transmitted in a network; and a processing unit, configured to configure the handover policy to another network entity, so that the another network entity performs a handover operation based on the handover policy during a handover of the access network entity.

According to some aspects, some embodiments of this application provides a computer-readable medium, thereupon storing a computer program, the computer program, when executed by a processor, implementing the network handover processing method according to the foregoing embodiments.

According to some aspects, some embodiments of this application provides an electronic device, including: one or more processors; and a storage apparatus, configured to store one or more programs, the one or more programs, when executed by the one or more processors, causing the electronic device to implement the network handover processing method in some embodiments as described above.

According to some aspects, some embodiments of this application provides a computer program product or computer program, the computer program product or computer program including a computer instruction stored in a computer-readable storage medium. A processor of a computer device reads the computer instruction from the computer-readable storage medium, and executes the computer instruction to enable the computer device to implement the network handover processing method provided in the foregoing optional embodiments.

In the technical solutions provided in some embodiments of the disclosure, a policy control functional entity receives traffic stream feature information sent by a network data analysis functional entity, then generates, based on the traffic stream feature information, a handover policy to be followed during a handover of an access network entity connected to the user equipment, and sends the handover policy to a session management functional entity, so that the session management functional entity configures the handover policy to another network entity. In this way, the handover policy to be followed during a handover of the access network entity is flexibly adjusted, so as to ensure that the handover policy matches actual traffic stream feature information, and avoid high handover costs and high network resource consumption.

Figure 2:
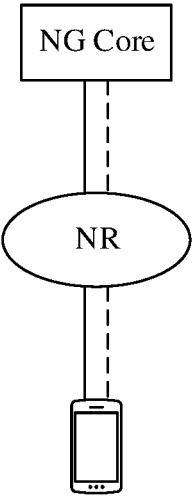
FIG. 2 is a schematic diagram of a networking mode for a 5G system.

In a 5G system, two networking modes as shown in FIG. 1 and FIG. 2 are provided. The networking mode shown in FIG. 1 is non-standalone (NSA), where dotted lines indicate a control plane, that is, a channel used for sending signaling required to manage and schedule resources; and solid lines indicate a user plane, that is, a channel used for sending specific data. NSA uses a dual connection mode, with a 5G new radio (NR) control plane anchored to 4G long term evolution (LTE), and requires a 4G evolved packet core (EPC).

The networking mode shown in FIG. 2 is standalone (SA). As a complete and independent 5G network without relying on 4G, 5G NR is directly connected to a 5G core (NR Core).

Figure 3:
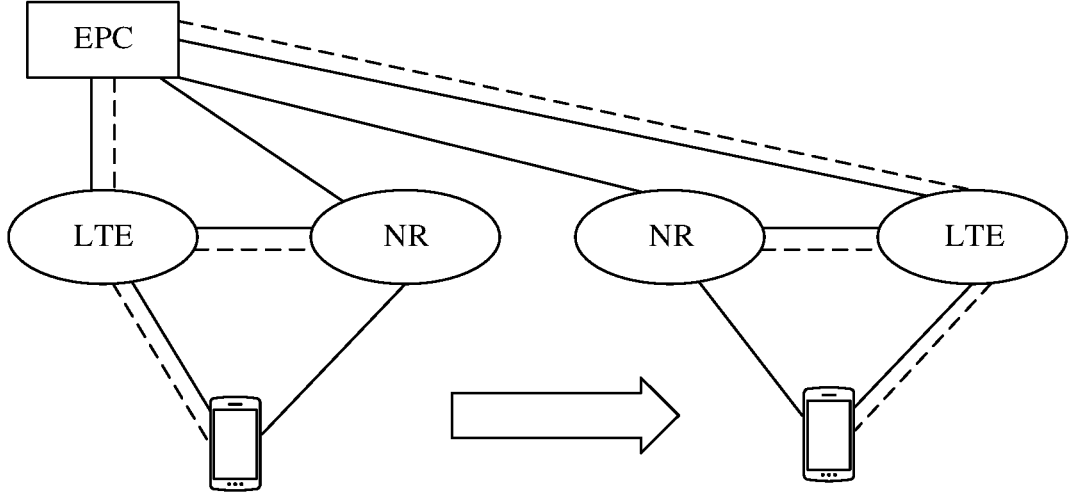
FIG. 3 is a schematic diagram of a network handover procedure for a 5G system.

A handover mechanism is further introduced in the 5G system to implement a handover between access network devices connected to UE. For the NSA mode, the handover is more complicated because 5G and 4G are interconnected at an access network level. Specifically, because 5G NR is anchored to 4G LTE, operation it typically takes several operations to complete an NR-to-NR handover if an LTE anchor changes. Specifically, as shown in FIG. 3, in an NR-to-NR handover, a source subcarrier may be deleted first to release source NR resources, then an LTE-to-LTE handover is performed, and a target subcarrier is added to reallocate target NR resources. The whole process is complicated and has a high delay.

Figure 4:
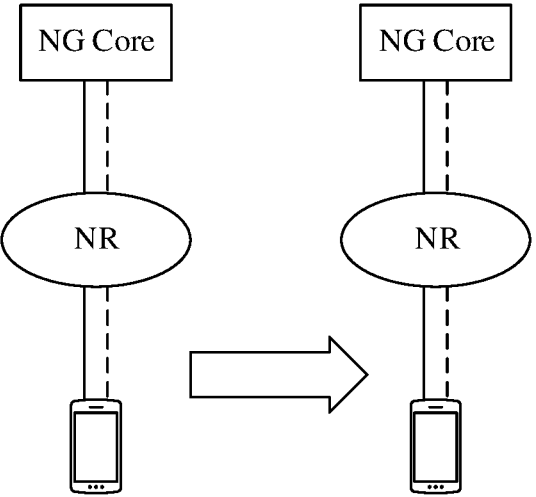
FIG. 4 is a schematic diagram of a network handover procedure for a 5G system.

For the SA mode, as shown in FIG. 4, an NR-to-NR handover is independent of an LTE handover, and is relatively simple with a low delay.

Figure 5:
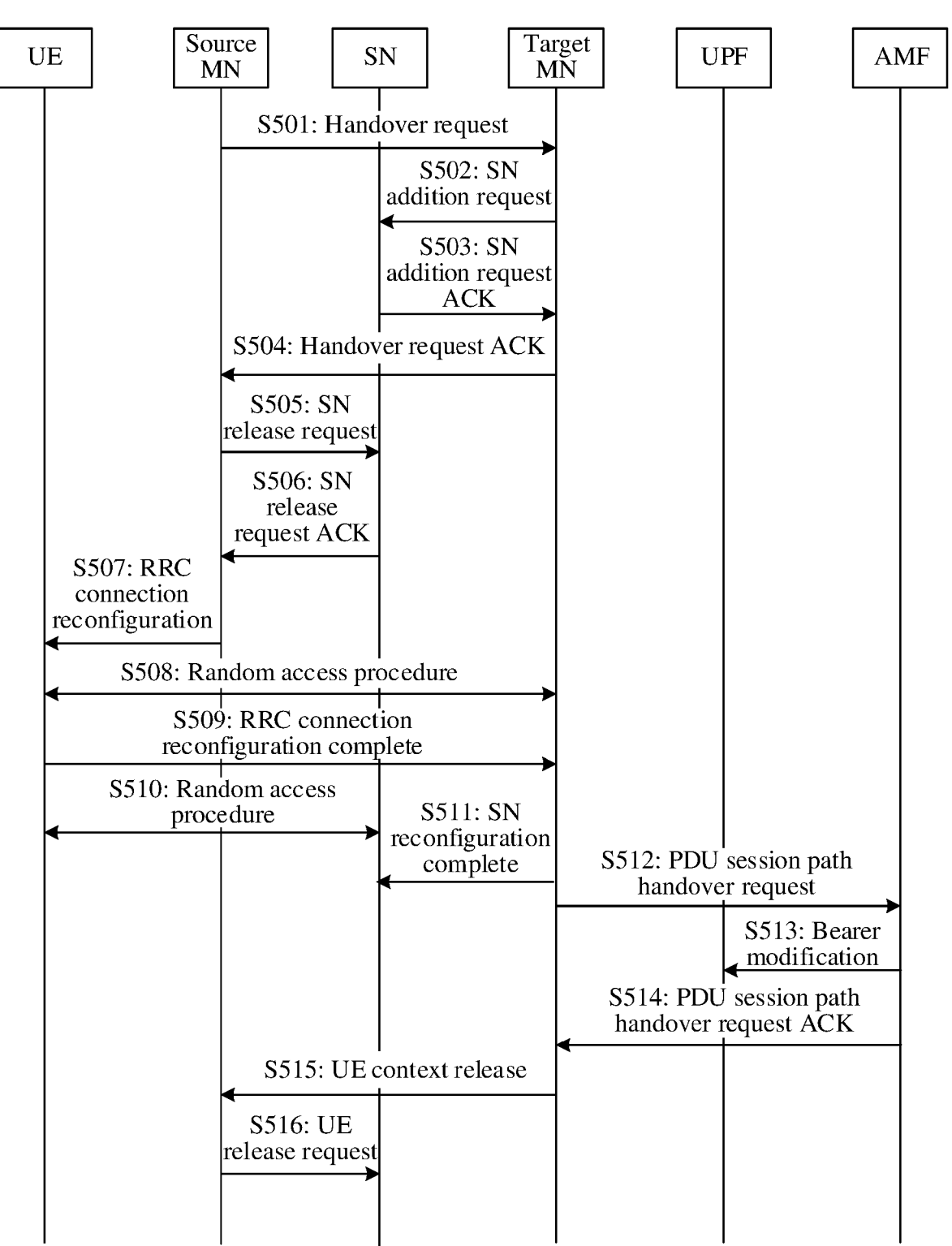
FIG. 5 is a schematic diagram of a network handover procedure.

In addition, to guarantee handover performance, a handover mechanism based on a dual connection architecture is further proposed in related art, that is, an access network device uses an architecture including a master node (MN) and a secondary node (SN). The SN can remain unchanged during a handover of the MN, thereby ensuring that data can be continuously forwarded through the SN. A specific process is shown in FIG. 5, including the following operations:

S501: A source MN sends a handover request to a target MN.

S502: The target MN sends an SN addition request to an SN.

S503: The SN feeds back an SN additional request ACK to the target MN.

S504: The target MN sends a handover request ACK to the source MN.

S505: The source MN sends an SN release request to the SN.

S506: The SN sends an SN release request ACK to the source MN.

S507: The source MN sends a radio resource control (RRC) connection reconfiguration message to UE.

S508: The UE initiates a random access procedure to the target MN.

S509: An RRC connection reconfiguration procedure between the UE and the target MN is completed (i.e., RRC connection reconfiguration complete).

S510: The UE initiates a random access procedure to the SN.

S511: The target MN sends a reconfiguration complete message (SN reconfiguration complete) to the SN.

S512: The target MN sends a protocol data unit (PDU) session path switch request to an access and mobility management function (AMF).

S513: The AMF modifies a user plane function (UPF) of a bearer PDU session, that is, a bearer modification procedure.

S514: The AMF sends a PDU session path switch request ACK to the target MN.

S515: The target MN sends a UE context release message to the source MN.

S516: The source MN initiates a UE release request to the SN.

In the handover process shown in FIG. 5, handover performance is guaranteed by configuring a dual connection mode, which is expensive and requires more network resources. In some other technical solutions, to guarantee handover performance, it is also provided to ensure lossless data transmission by using data caching and data forwarding mechanisms during a handover. The data forwarding mechanism includes data forwarding, in which a base station before the handover forwards cached data to a base station after the handover, so as to ensure that data is not lost.

Nowadays, real-time multimedia services and services such as extended reality (XR) and augmented reality (AR) are rapidly developing and popularizing. In addition, real-time multimedia services and services such as XR use high data transmission rates and a large amount of cache and data. If caching and data forwarding mechanisms are used indiscriminately for such services, real-time data transmission without loss and disorder will require extremely high costs of network resources.

However, data packets are transmitted with a transmission interval. Therefore, handover performance will not be affected as long as the handover occurs within the transmission time and handover delay does not exceed the transmission interval. In this case, the pursuit of extremely low handover delay does not help to improve user experience at an application layer, and unnecessarily wastes network resources.

Specifically, as shown in FIG. 6, a transmission interval (i.e., an arrival interval) of data packets is T1, and interrupt time due to handover is T2. As long as the handover occurs within the transmission interval of the data packets and T2<T1, service side characteristics will not be affected. It can be seen that it is not worthwhile to reduce the handover interrupt delay to a shorter time than T2, that is, handover mechanisms in related art generally occupy excessive additional resources and cost too much.

Based on this, the technical solution in some embodiments of the disclosure provides a new network handover processing solution, which can flexibly adjust, based on traffic stream feature information, a handover policy to be followed during a handover of an access network entity, so as to ensure that the handover policy matches actual traffic stream feature information, thereby avoiding high handover costs and avoiding occupying excessive network resources.

The implementation details of the technical solution in some embodiments of the disclosure are described in detail below.

FIG. 7 is a flowchart of a network handover processing method provided in some embodiments of the disclosure, the network handover processing method can be executed by a policy control function (PCF) entity. Referring to FIG. 7, the network handover processing method includes at least operation S710 to operation S730. A detailed description is as follows:

In S710, traffic stream feature information sent by a network data analysis functional entity is received, the traffic stream feature information is used for indicating features of service data packets transmitted between the application side and user equipment, and the traffic stream feature information being generated by the network data analysis functional entity in accordance with the service data packets transmitted in a network.

In some embodiments of the disclosure, the application side may be an application function (AF) or an application server (AS). The user equipment may be a smartphone, a tablet computer, a notebook computer, a desktop computer, a smart speaker, a smartwatch, a smart home, a vehicle terminal, or the like, but is not limited thereto.

The Network Data Analytics Function (NWDAF) entity is a data-aware analytics network element that can automatically perceive and analyze the network based on network data. Specifically, NWDAF can collect raw data from core network elements, AF, OAM (Operation Administration and Maintenance) systems, etc., and perform intelligent analysis on the raw data to output analytical data for network and service optimization. For example, NWDAF can collect information such as network performance, specific area traffic load, and traffic experience, and use reliable network performance analysis and prediction models to evaluate and analyze different types of traffics, build traffic portraits, determine the QoE (Quality of Experience) and traffic path, 5G QoS (Quality of Service), and other intrinsic relationships.

NWDAF can support PCF requests or subscriptions for related analytical data and receive notifications. That is, PCF can subscribe to the detection service of traffic stream feature information from the network data analysis functional entity. Furthermore, when the network data analysis functional entity obtains the traffic stream feature information through analysis, it can provide feedback of traffic stream feature information to PCF.

In some embodiments of the disclosure, the traffic stream feature information includes at least one of: a transmission interval of the service data packets, a packet size of the service data packets, and importance of the service data packets.

In some embodiments, the transmission interval of the service data packets is a sending time interval between two adjacent service data packets, or a receiving time interval between two adjacent service data packets. For example, if the service data packets are sent periodically, the period is the transmission interval of the service data packets.

The packet size of the service data packets is a data size of the service data packets. The importance of the service data packets can be reflected, for example, by the type of the service data packets, for example, the importance of a key frame (e.g., an I frame) is higher than that of a non-key frame (e.g., a P frame).

Still referring to FIG. 7, in S720, a handover policy is generated based on the traffic stream feature information, the handover policy is a policy to be followed during a handover of an access network entity connected to the user equipment.

In some embodiments, for a 5G network, the access network entity may be an NR base station; and for a 4G network, the access network entity may be an LTE base station.

In some embodiments of the disclosure, the handover policy includes at least one of: whether to perform data forwarding during a handover; a tolerable handover delay during a handover; a context transfer requirement of a source and a destination during a handover, the context transfer requirement including any one of full configuration, partial configuration, and delta configuration; and whether the user equipment executes a make before break policy or a break before make policy during a handover.

Some embodiments may or may not perform data forwarding. For example, even if data forwarding is performed due to requirements of real-time services, the operation is not helpful for the real-time services, and causes a waste of network resources. In this case, data forwarding may not be performed.

The tolerable handover delay during a handover is used for indicating the maximum delay required during a handover. Generally, the maximum delay during a handover is to be less than or equal to the tolerable handover delay. The context transfer requirement of the source and the destination during a handover may include any one of full configuration, partial configuration, and delta configuration.

For make before break and break before make, if a make before break policy is executed, smoothness of the handover can be guaranteed, but the UE may need to have the ability to connect to a plurality of access network devices at the same time. The make before break and break before make policies can be based on a dual connection architecture (that is, an access network device uses an architecture including an MN and an SN) or a non-dual connection architecture. In addition, the technical solution in some embodiments of the disclosure applies not only to a dual connection architecture, but also to a non-dual connection architecture.

In some embodiments of the disclosure, if the traffic stream feature information includes a transmission interval of service data packets, a handover policy including a tolerable handover delay during a handover can be generated based on the transmission interval of the service data packets. Specifically, as shown in FIG. 6, the handover performance can be guaranteed when the tolerable handover delay during a handover is less than or equal to the transmission interval of the service data packets. Therefore, a handover policy including the tolerable handover delay during a handover can be generated based on the transmission interval of the service data packets. In some embodiments, the tolerable handover delay during a handover is less than or equal to the transmission interval of the service data packets.

In some embodiments of the disclosure, if the traffic stream feature information includes at least importance of service data packets, a handover policy including at least whether to perform data forwarding during a handover can be generated based on the importance of the service data packets. Specifically, if the service data packets are important, the generated handover policy may be that data forwarding is performed; if the service data packets are unimportant, to reduce wastes of network resources, the generated handover policy can be not to perform data forwarding processing; and if one part of the service data packets are important, and the another part of the service data packets are unimportant, the generated handover policy may also be that data forwarding is performed on some service data packets (important service data packets), and data forwarding is not performed on the another service data packets (unimportant service data packets).

In some embodiments of the disclosure, if the generated handover policy includes whether the user equipment executes a make before break policy or a break before make policy during a handover, obtaining network connection capability information of the user equipment before the handover policy is generated may be performed, and the network connection capability information is used for indicating a quantity of access network entities to which the user equipment can be connected at the same time. If the network connection capability information of the user equipment indicates that the user equipment can connect to a plurality of access network entities at the same time, the generated handover policy may be that the user equipment executes the make before break policy; and if the network connection capability information of the user equipment indicates that the user equipment cannot connect to a plurality of access network entities at the same time, the generated handover policy is that the user equipment executes the break before make policy during a handover.

In some embodiments of the disclosure, when a handover policy is generated, a handover policy configured in another network entity can also be obtained, and then a handover policy to be followed during a handover of an access network entity is generated based on traffic stream feature information and the handover policy configured in the another network entity. For example, it is determined, based on the traffic stream feature information and the handover policy configured in the another network entity, whether to update the handover policy configured in the another network entity, and a new handover policy is generated if an update is required.

Still referring to FIG. 7, in S730, the generated handover policy is sent to a session management functional entity, so that the session management functional entity configures the handover policy to another network entity.

In some embodiments, the another network entity may include the AMF, an access network entity (e.g., base station equipment), user equipment, or the like. Specifically, the PCF can send the generated handover policy to a session management function (SMF), the SMF then sends the generated handover policy to the AMF, and the AMF configures the handover policy to the access network entity and the user equipment. The handover policy in some embodiments of the disclosure may include a handover policy for each network entity or a handover policy for all network entities.

FIG. 8 is a flowchart of a network handover processing method provided in some embodiments of the disclosure, the network handover processing method can be executed by a session management functional entity. Referring to FIG. 8, the network handover processing method includes at least operation S810 to operation S820. A detailed description is as follows:

In operation S810, a handover policy sent by a policy control functional entity is received, the handover policy indicates a policy to be followed during a handover of an access network entity connected to user equipment, the handover policy is generated by the policy control functional entity based on traffic stream feature information provided by an application side, and the traffic stream feature information is used for indicating features of service data packets transmitted between the application side and the user equipment.

In some embodiments of the disclosure, the handover policy includes at least one of: whether to perform data forwarding during a handover; a tolerable handover delay during a handover; a context transfer requirement of a source and a destination during a handover, the context transfer requirement including any one of full configuration, partial configuration, and delta configuration; and whether the user equipment executes a make before break policy or a break before make policy during a handover.

In some embodiments of the disclosure, the traffic stream feature information includes at least one of: a transmission interval of the service data packets, a packet size of the service data packets, and importance of the service data packets.

For detailed descriptions of the handover policy and the traffic stream feature information, reference may be made to the technical solutions in the foregoing embodiments. Details are not described herein again.

In operation S820, the handover policy is configured to another network entity, so that the another network entity performs a handover operation based on the handover policy during a handover of the access network entity.

Specifically, the session management functional entity can configure the handover policy to an access and mobility management functional entity and the user equipment, then the access and mobility management functional entity updates, based on the handover policy, a handover policy for the user equipment and the service data packets, and the access and mobility management functional entity configures the handover policy to connected access network entities (specifically, for example, access network entities before and after the handover).

The technical solution in some embodiments of the disclosure can flexibly adjust, based on traffic stream feature information, a handover policy to be followed during a handover of an access network entity, so as to ensure that the handover policy matches actual traffic stream feature information, thereby avoiding high handover costs and high network resource consumption.

Figure 9:
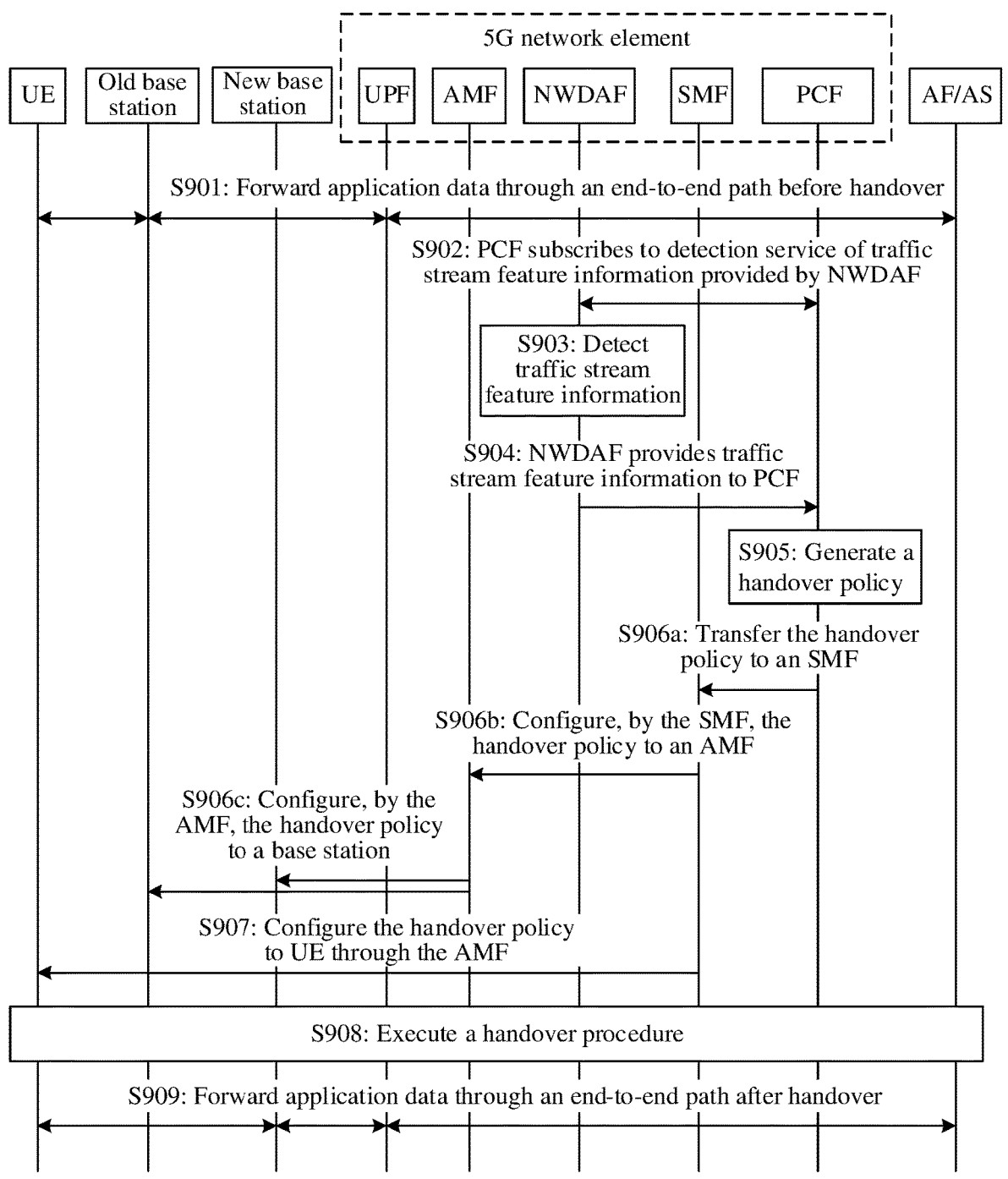
FIG. 9 is a flowchart of a network handover processing method according to some embodiments.

Specifically, considering wide bandwidth for multimedia services and services such as XR and AR, caching or data forwarding requires a large number of resources. Therefore, with the assistance of NWDAF, traffic stream feature information such as packet interval and other parameters is obtained and provided to a control plane network element to form a corresponding handover policy. Using a 5G network as an example, the implementation details of the technical solution in some embodiments of the disclosure are described in detail with reference to FIG. 9, and include the following operations:

S901: Application data is forwarded through an end-to-end path before handover. Specifically, the UE is connected to the UPF through an old base station, and then is connected to an application server through the UPF. In FIG. 9, the AF and the AS are drawn together. In fact, the AF and the AS are a control plane network element and a user plane network element, respectively, and can be deployed separately.

S902: The PCF subscribes to the NWDAF for service of detecting and analyzing traffic stream feature information.

S903: The NWDAF analyzes traffic stream feature information by obtaining information from different network elements. In some embodiments, the network elements from which NWDAF obtains information include, but are not limited to, UPF, NG-RAN (i.e., the new base station shown in FIG. 9), and other devices.

In some embodiments, the traffic stream feature information includes, but is not limited to: an arrival interval, a packet size feature, importance, and the like of periodic service data flow.

S904: NWDAF provides the traffic stream feature information to the PCF.

S905: The PCF generates, based on the obtained traffic stream feature information and information from other 5GC network elements, a corresponding handover policy.

In some embodiments, the information from other 5GC network elements includes, but is not limited to, information on UE-specific handover policies that have been configured on network elements such as the SMF and the AMF.

In some embodiments, the handover policy includes at least one of: whether to perform data forwarding during a handover; a tolerable handover delay during a handover; a context transfer requirement of a source and a destination during a handover, the context transfer requirement including any one of full configuration, partial configuration, and delta configuration; and whether the user equipment executes a make before break policy or a break before make policy during a handover.

Some embodiments may or may not perform data forwarding. For example, even if data forwarding is performed due to requirements of real-time services, the operation is not helpful for the real-time services, and may cause a waste of network resources. In this case, data forwarding is not necessary.

The tolerable handover delay during a handover is used for indicating the maximum delay required during a handover. Generally, the maximum delay during a handover is to be less than or equal to the tolerable handover delay. The context transfer requirement of the source and the destination during a handover may include full configuration, partial configuration, and delta configuration.

For make before break and break before make, if a make before break policy is executed, smoothness of the handover can be guaranteed, but the UE is required to have the ability to connect to a plurality of access network devices at the same time.

In some embodiments of the disclosure, if the traffic stream feature information includes a transmission interval of service data packets, a handover policy including a tolerable handover delay during a handover can be generated based on the transmission interval of the service data packets. Specifically, as shown in FIG. 6, the handover performance can be guaranteed when the tolerable handover delay during a handover is less than or equal to the transmission interval of the service data packets. Therefore, a handover policy including the tolerable handover delay during a handover can be generated based on the transmission interval of the service data packets. In some embodiments, the tolerable handover delay during a handover is less than or equal to the transmission interval of the service data packets.

In some embodiments of the disclosure, if the traffic stream feature information includes at least importance of service data packets, a handover policy including at least whether to perform data forwarding during a handover can be generated based on the importance of the service data packets. Specifically, if the service data packets are important, the generated handover policy may be that data forwarding is performed; if the service data packets are unimportant, to reduce wastes of network resources, the generated handover policy may be that data forwarding is not performed; and if one part of the service data packets are important, and the another part of the service data packets are unimportant, the generated handover policy may also be that data forwarding is performed on some service data packets (important service data packets), and data forwarding is not performed on the another service data packets (unimportant service data packets).

In some embodiments of the disclosure, when a handover policy is generated, it is determined, based on the traffic stream feature information and the handover policy configured in the another network entity, whether to update the handover policy configured in the another network entity, and a new handover policy is generated if an update is required.

S906: The generated handover policy is configured from the PCF to the AMF and base stations.

Specifically, in operation S906*a*, the PCF configures the handover policy to the SMF; and in operation S906*b*, the SMF configures the handover policy to the AMF, and after the configuration, the handover policy in the AMF may be updated for the specific UE and the specific service; and in operation S906*c*, the AMF configures the handover policy to base stations (including an old base station and a new base station), context information of gNB will be configured or updated in this operation, thus affecting the handover policy for the UE.

S907. The generated handover policy for the specific UE is configured to the UE through the AMF. The handover policy configured on the UE will affect a corresponding caching and data forwarding policy.

S908: A handover procedure is executed based on the configured policy. Configuration of the handover policy will be updated in the handover procedure, that is, whether there is data caching and data forwarding, whether lossless handover is required, and so on.

S909: Application data is forwarded through an end-to-end path after handover. Specifically, the UE is connected to the UPF through a new base station, and then is connected to an application server through the UPF.

some embodiments Some embodiments of the disclosure can resolve the general problem of excessive costs of network resources due to a large amount of cached and forwarded data in real-time multimedia, XR and other services, and can reduce costs of data caching and forwarding operations required for lossless handover.

The following describes some apparatus embodiments of the disclosure, and the apparatus embodiments may be used for performing the network handover processing method in the foregoing embodiments of the disclosure. For details not disclosed in the apparatus embodiments of the disclosure, reference may be made to the foregoing network handover processing method embodiments of the disclosure.

Figure 10:
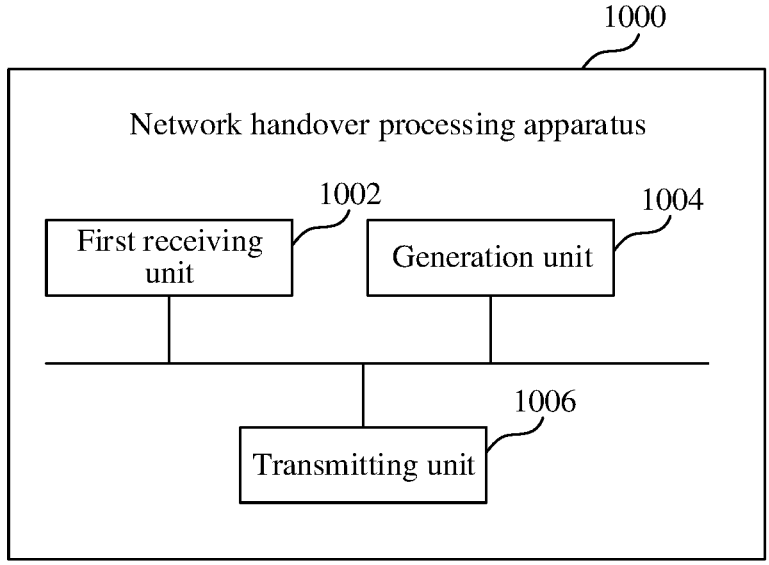
FIG. 10 is a block diagram of a network handover processing apparatus according to some embodiments.

FIG. 10 is a block diagram of a network handover processing apparatus according to some embodiments of the disclosure, the network handover processing apparatus may be disposed in a policy control functional entity.

Referring to FIG. 10, a network handover processing apparatus 1000 according to some embodiments of the disclosure includes: a first receiving unit 1002, a generation unit 1004, and a transmitting unit 1006, among them, the first receiving unit 1002 is configured to receive traffic stream feature information sent by a network data analysis functional entity, the traffic stream feature information is used for indicating features of service data packets transmitted between the application side and user equipment, and the traffic stream feature information is generated by the network data analysis functional entity in accordance with the service data packets transmitted in a network; and a generation unit, configured to generate, based on the traffic stream feature information, a handover policy, the handover policy being a policy to be followed during a handover of an access network entity connected to the user equipment; and the transmitting unit 1006 is configured to send the handover policy to a session management functional entity, so that the session management functional entity configures the handover policy to another network entity.

In some embodiments of the disclosure, based on the foregoing solution, the first receiving unit 1002 is configured to: subscribing to detection service of traffic stream feature information provided by network data analysis functional entity; and receiving the traffic stream feature information provided by the network data analysis functional entity based on the feedback from the subscribed detection service.

In some embodiments of the disclosure, based on the foregoing solution, the handover policy includes at least one of:

whether to perform data forwarding during a handover;

a tolerable handover delay during a handover;

a context transfer requirement of a source and a destination during a handover, the context transfer requirement including any one of full configuration, partial configuration, and delta configuration; and whether the user equipment executes a make before break policy or a break before make policy during a handover.

In some embodiments of the disclosure, based on the foregoing solution, the traffic stream feature information includes at least one of: a transmission interval of the service data packets, a packet size of the service data packets, and importance of the service data packets.

In some embodiments of the disclosure, based on the foregoing solution, the traffic stream feature information includes at least a transmission interval of the service data packets. The generation unit 1004 is configured to: generate, based on a transmission interval of the service data packets, a handover policy including at least a tolerable handover delay during a handover.

In some embodiments of the disclosure, based on the foregoing solution, the tolerable handover delay during a handover is less than or equal to the transmission interval of the service data packets.

In some embodiments of the disclosure, based on the foregoing solution, the traffic stream feature information includes at least importance of the service data packets. The generation unit 1004 is configured to: generate, based on the importance of the service data packets, a handover policy including at least whether to perform data forwarding during a handover.

In some embodiments of the disclosure, based on the foregoing solution, the handover policy includes whether the user equipment executes a make before break policy or a break before make policy during a handover. The generation unit 1004 obtains network connection capability information of the user equipment before generating a handover policy, the network connection capability information is used for indicating a quantity of access network entities to which the user equipment can be connected at the same time.

In some embodiments of the disclosure, based on the foregoing solution, the generation unit 1004 is configured to: obtain a handover policy configured in the another network entity; and generate, based on the traffic stream feature information and the handover policy configured in the another network entity, the handover policy.

Figure 11:
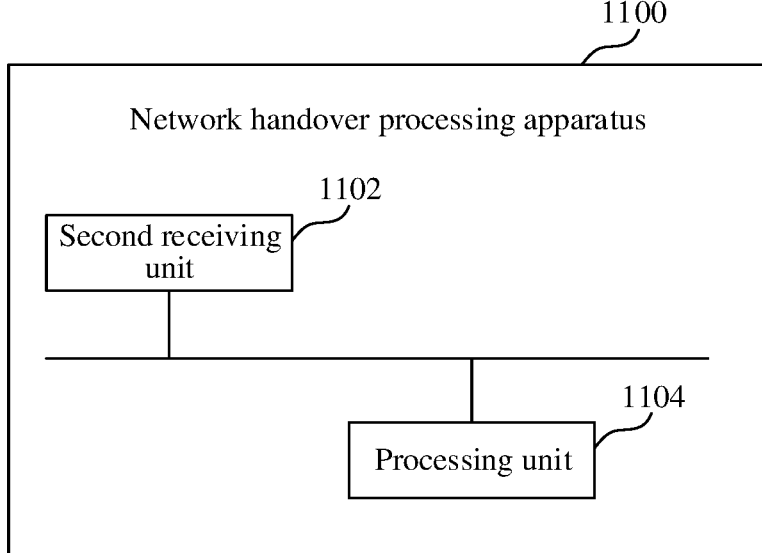
FIG. 11 is a block diagram of a network handover processing apparatus according to some embodiments.

FIG. 11 is a block diagram of a network handover processing apparatus according to some embodiments of the disclosure, the network handover processing apparatus may be disposed in a session management functional entity.

Referring to FIG. 11, a network handover processing apparatus 1100 according to some embodiments of the disclosure includes: a second receiving unit 1102 and a processing unit 1104, among them, the second receiving unit 1102 is configured to receive a handover policy sent by a policy control functional entity, the handover policy indicates a policy to be followed during a handover of an access network entity connected to user equipment, the handover policy is generated by the policy control functional entity based on traffic stream feature information sent by a network data analysis functional entity, and the traffic stream feature information is used for indicating features of service data packets transmitted between the application side and the user equipment, the traffic stream feature information is generated by the network data analysis functional entity in accordance with the service data packets transmitted in a network; and the processing unit 1104 is configured to configure the handover policy to another network entity, so that the another network entity performs a handover operation based on the handover policy during a handover of the access network entity.

In some embodiments of the disclosure, based on the foregoing solution, the processing unit 1104 is configured to:

configure the handover policy to an access and mobility management functional entity and the user equipment, so as to instruct the access and mobility management functional entity to update, based on the handover policy, a handover policy for the user equipment and the service data packets, and instruct the access and mobility management functional entity to configure the handover policy to connected access network entities.

Figure 12:
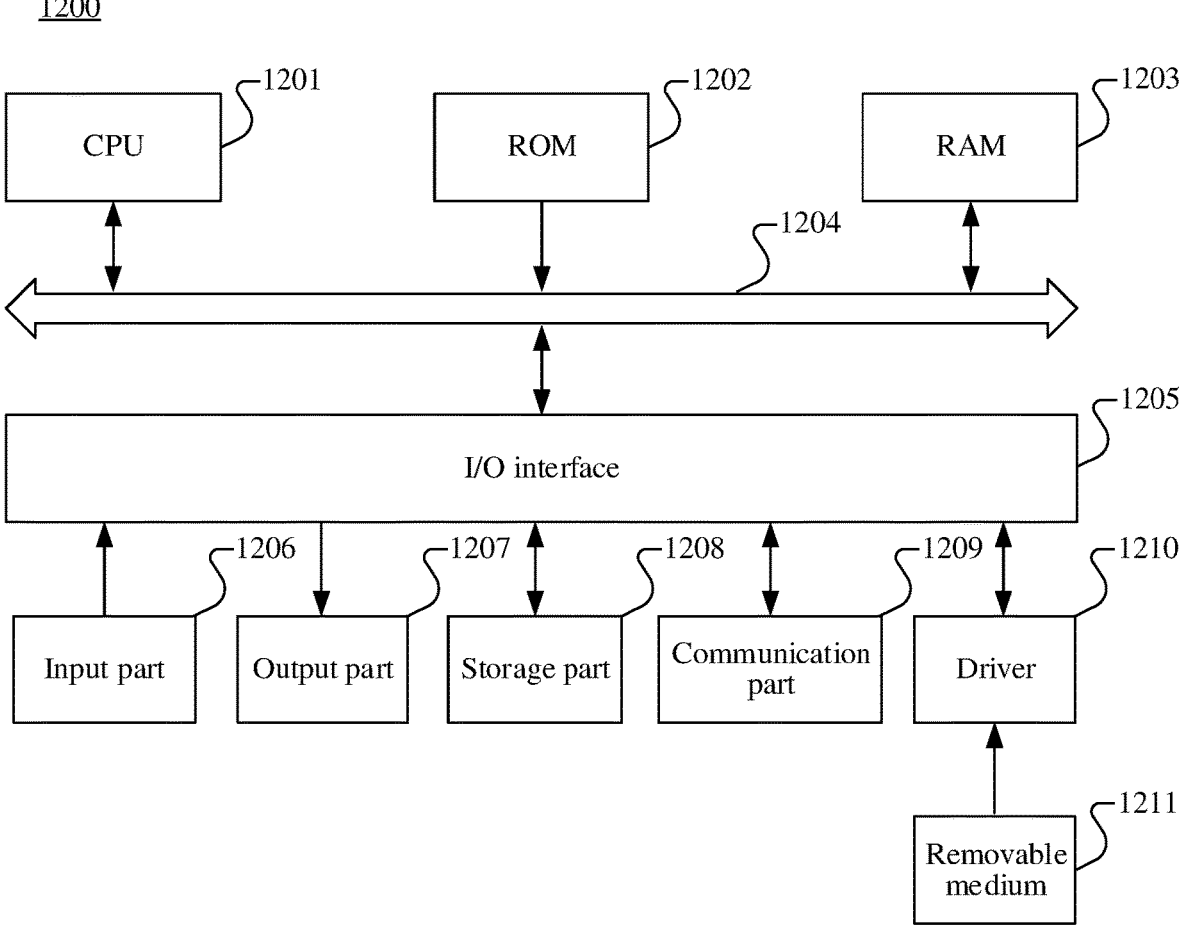
FIG. 12 is a schematic structural diagram of a computer system adapted to implement an electronic device according to some embodiments.

FIG. 12 is a schematic structural diagram of a computer system adapted to implement an electronic device according to some embodiments of the disclosure.

A computer system 1200 of the electronic device shown in FIG. 12 is merely an example, and does not constitute any limitation on functions and use ranges of some embodiments of the disclosure.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, for example, perform the method described in the foregoing embodiments. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like; and an output part 1207 including a cathode ray tube (CRT), a liquid crystal display (LCD), a speaker, or the like; and a storage part 1207 including a hard disk, or the like; and a communication part 1209 including a network interface card such as a local area network (LAN) card or a modem, or the like. The communication part 1209 performs communication processing by using a network such as the Internet. A driver 1210 is also connected to the I/O interface 1205 as required. A removable medium 1211, such as a magnetic disk, an optical disc, a magneto-optical disk, or a semiconductor memory, is installed on the driver 1210 as required, so that a computer program read from the removable medium is installed into the storage part 1208 as required.

Particularly, according to some embodiments of the disclosure, the processes described in the following by referring to the flowcharts may be implemented as computer software programs. For example, some embodiments of the disclosure include a computer program product. The computer program product includes a computer program stored in a computer-readable medium. The computer program includes a computer program used for performing a method shown in the flowchart. In some embodiments, the computer program may be downloaded and installed from a network through the communication part 1209, and/or installed from the removable medium 1211. When the computer program is executed by the CPU 1201, the various functions defined in the system of the disclosure are executed.

The computer-readable medium shown in some embodiments of the disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. More specific examples of computer-readable storage medium may include, but are not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may in some embodiments occur in a sequence different from that annotated in an accompanying drawing. For example, actually two boxes shown in succession may be performed basically in parallel, and sometimes the two boxes may be performed in a reverse sequence. This is determined by a related function. It is also important that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in some embodiments of the disclosure may be implemented in a software manner, or may be implemented in a hardware manner, and the unit described can also be set in a processor. Names of the units do not constitute a limitation on the units in a specific case.

According to another aspect, the disclosure further provides a computer-readable medium. The computer-readable medium may be included in the electronic device described in the foregoing embodiments; or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of some embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to some embodiments of the disclosure.

After considering the specification and practicing the implementations of the present disclosure, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

It is to be understood that the disclosure is not limited to the precise structures described above and shown in the accompanying drawings, and various modifications and changes can be made without departing from the scope of the disclosure. The scope of the disclosure is subject only to the appended claims.

What is claimed is:

1. A network handover processing method, executed by a policy control functional entity, the method comprising:

receiving traffic stream feature information sent by a network data analysis functional entity, the traffic stream feature information indicating features of service data packets transmitted between an application side and user equipment, wherein the traffic stream feature information comprises at least one of a transmission interval of the service data packets or a packet size of the service data packets, and wherein the traffic stream feature information has been generated by the network data analysis functional entity in accordance with the service data packets;

generating, based on the traffic stream feature information, a handover policy, wherein the handover policy is a policy to be followed during a handover of an access network entity connected to the user equipment, and wherein the handover policy comprises a maximum handover delay that is determined based on at least one of the transmission interval or the packet size; and transmitting the handover policy to a session management functional entity.

2. The network handover processing method according to claim 1, wherein the receiving the traffic stream feature information comprises:

subscribing to detection service of traffic stream feature information provided by the network data analysis functional entity; and receiving the traffic stream feature information provided by the network data analysis functional entity based on feedback from the subscribed detection service.

3. The network handover processing method according to claim 1, wherein the handover policy comprises at least one of:

whether to perform data forwarding during the handover;

a context transfer requirement of a source and a destination during the handover, the context transfer requirement comprising any one of full configuration, partial configuration, and delta configuration; and whether the user equipment executes a make before break policy or a break before make policy during the handover.

4. The network handover processing method according to claim 1, wherein the traffic stream feature information further comprises importance of the service data packets.

5. The network handover processing method according to claim 1, wherein the traffic stream feature information comprises the transmission interval of the service data packets, and wherein the generating the handover policy comprises:

generating, based on the transmission interval of the service data packets, the handover policy comprising the maximum handover delay.

6. The network handover processing method according to claim 5, wherein the maximum handover delay is less than or equal to the transmission interval of the service data packets.

7. The network handover processing method according to claim 1, wherein the traffic stream feature information comprises at least an importance of the service data packets, and wherein the generating the handover policy comprises:

generating, based on the importance of the service data packets, a handover policy comprising at least whether to perform data forwarding during the handover.

8. The network handover processing method according to claim 1, wherein the handover policy comprises whether the user equipment executes a make before break policy or a break before make policy during the handover; and before generating the handover policy, the network handover processing method further comprises:

obtaining network connection capability information of the user equipment, the network connection capability information indicating a quantity of access network entities to which the user equipment can be connected at the same time.

9. The network handover processing method according to claim 1 wherein the generating the handover policy comprises:

obtaining a different handover policy configured in a different network entity; and generating, based on the traffic stream feature information and the handover policy configured in the different network entity, the handover policy.

10. The network handover processing method according to claim 1, wherein the session management functional entity configures the handover policy to a different network entity, so that the different network entity performs a handover operation based on the handover policy during the handover of the access network entity configuring the handover policy to an access and mobility management functional entity and the user equipment, to instruct the access and mobility management functional entity to update, based on the handover policy, a handover policy for the user equipment and the service data packets, and instruct the access and mobility management functional entity to configure the handover policy to connected access network entities.

11. A network handover processing apparatus comprising:

at least one memory configured to store computer program code; and at least one processor configured to access the at least one memory and operate according to the computer program code, the computer program code including:

receiving code configured to cause at least one of the at least one processor to receive traffic stream feature information sent by a network data analysis functional entity, the traffic stream feature information indicating features of service data packets transmitted between an application side and user equipment, wherein the traffic stream feature information comprises at least one of a transmission interval of the service data packets or a packet size of the service data packets, and wherein the traffic stream feature information has been generated by the network data analysis functional entity in accordance with the service data packets;

generating code configured to cause at least one of the at least one processor to generate, based on the traffic stream feature information, a handover policy, wherein the handover policy is a policy to be followed during a handover of an access network entity connected to the user equipment, and wherein the handover policy comprises a maximum handover delay that is determined based on at least one of the transmission interval or the packet size; and transmitting code configured to cause at least one of the at least one processor to transmit the handover policy to a session management functional entity.

12. The network handover processing apparatus according to claim 11, wherein the receiving code is further configured to cause the at least one processor to:

subscribe to detection service of traffic stream feature information provided by the network data analysis functional entity; and receive the traffic stream feature information provided by the network data analysis functional entity based on feedback from the subscribed detection service.

13. The network handover processing apparatus according to claim 11, wherein the handover policy comprises at least one of:

whether to perform data forwarding during the handover;

a context transfer requirement of a source and a destination during the handover, the context transfer requirement comprising any one of full configuration, partial configuration, and delta configuration; and whether the user equipment executes a make before break policy or a break before make policy during the handover.

14. The network handover processing apparatus according to claim 11, wherein the traffic stream feature information further comprises importance of the service data packets.

15. The network handover processing apparatus according to claim 11, wherein the traffic stream feature information comprises the transmission interval of the service data packets and wherein the generating the handover policy comprises:

generating, based on the transmission interval of the service data packets, the handover policy comprising the maximum handover delay.

16. The network handover processing apparatus according to claim 15, wherein the maximum handover delay is less than or equal to the transmission interval of the service data packets.

17. The network handover processing apparatus according to claim 11, wherein the traffic stream feature information comprises at least an importance of the service data packets; and wherein the generating the handover policy comprises:

generating, based on the importance of the service data packets, the handover policy comprising at least whether to perform data forwarding during a handover.

18. The network handover processing apparatus according to claim 11, wherein the handover policy further comprises whether the user equipment executes a make before break policy or a break before make policy during the handover, and wherein the program code further comprises network code configured to execute before the generating code, wherein the network code is configured to cause the at least one processor to:

obtain network connection capability information of the user equipment, the network connection capability information indicating a quantity of access network entities to which the user equipment can be connected at the same time; and wherein the generating code is further configured to cause at least one of the at least one processor to:

obtain a handover policy configured in a different network entity; and generate, based on the traffic stream feature information and the handover policy configured in the different network entity, the handover policy.

19. The network handover processing apparatus according to claim 11, wherein the session management functional entity configures the handover policy to a different network entity, so that the different network entity performs a handover operation based on the handover policy during the handover of the access network entity configuring the handover policy to an access and mobility management functional entity and the user equipment, to instruct the access and mobility management functional entity to update, based on the handover policy, a handover policy for the user equipment and the service data packets, and instruct the access and mobility management functional entity to configure the handover policy to connected access network entities.

20. A non-transitory computer readable medium containing program code for network handover processing containing instructions that, when executed by at least one processor, cause the at least one processor to:

receive traffic stream feature information sent by a network data analysis functional entity, the traffic stream feature information indicating features of service data packets transmitted between an application side and user equipment, wherein the traffic stream feature information comprises at least one of a transmission interval of the service data packets or a packet size of the service data packets, and wherein the traffic stream feature information has been generated by the network data analysis functional entity in accordance with the service data packets;

generate, based on the traffic stream feature information, a handover policy, wherein the handover policy is a policy to be followed during a handover of an access network entity connected to the user equipment, and wherein the handover policy comprises a maximum handover delay that is determined based on at least one of the transmission interval or the packet size; and transmit the handover policy to a session management functional entity.

* * * * *